United States Patent
Anderson (10) Patent No.: US 6,473,875 B1
(45) Date of Patent: Oct. 29, 2002

(54) ERROR CORRECTION FOR NETWORK DELIVERY OF VIDEO STREAMS USING PACKET RESEQUENCING

(75) Inventor: Michael H. Anderson, Westlake Village, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/261,705

(22) Filed: Mar. 3, 1999

(51) Int. Cl.[7] ............................................. G06F 11/00
(52) U.S. Cl. ....................... 714/746; 714/751; 714/701
(58) Field of Search ................................ 714/746, 758, 714/751, 752, 701

(56) References Cited

U.S. PATENT DOCUMENTS

| | | | |
|---|---|---|---|
| 3,024,444 A | 3/1962 | Barry et al. ................. 340/147 |
| 3,037,075 A | 5/1962 | Blodgett ....................... 178/23 |
| 3,665,395 A | 5/1972 | Bochmann ............... 340/146.1 |
| 3,711,829 A | 1/1973 | Lubrano ....................... 34/146 |
| 4,405,942 A | * | 9/1983 | Block et al. |
| 4,567,595 A | | 1/1986 | Hedlund ........................ 371/49 |
| 4,914,655 A | | 4/1990 | Johannes et al. ........... 370/112 |
| 5,506,979 A | * | 4/1996 | Menon |
| 5,515,381 A | * | 5/1996 | Chan |
| 5,539,586 A | * | 7/1996 | Inoue et al. |
| 5,594,490 A | * | 1/1997 | Dawson et al. |
| 5,594,550 A | * | 1/1997 | Juri et al. |
| 6,145,109 A | * | 11/2000 | Schuster et al. |
| 6,243,846 B1 | * | 6/2002 | Schuster et al. |

* cited by examiner

Primary Examiner—Phung M. Chung
(74) Attorney, Agent, or Firm—Blakely, Sokoloff, Taylor & Zafman LLP (57) ABSTRACT

A host computer connected over a wide area network system to a client computer interleaves N groups of parity protected packets in order to recover from single or multiple error events of length T. Each of the N groups of data are comprised of M data packets plus one parity packer generated by the modulo-2 sum of data in like positions of the data packets within the group. An error event of length T affects only one packer in each of the N groups, allowing recovery of the lost data, assuming that N or less packets in succession are lost.

40 Claims, 6 Drawing Sheets

ERROR CORRECTION FOR NETWORK DELIVERY OF VIDEO STREAMS USING PACKET RESEQUENCING

BACKGROUND OF THE INVENTION

1. Field of the Invention

The present invention generally relates to a method of transmitting data over electronic communication paths. More specifically, the present invention relates to a method of transmitting data to reduce the adverse effects of data loss during the communication.

2. Description of Related Art

Wide area networks (WANs) routinely experience packet loss. This packet loss is often detected by high level protocols like TCP/IP. Subsequent error-recovery processes force re-transmission of the lost data. This method is acceptable in many applications. However, real-time oriented data, such as compressed video, often cannot withstand the delays associated with the error recovery.

One of the most prolific and cost effect wide area networks is represented by existing cable networks. It is possible to deliver high speed digital data using the co-axial cable already connected in millions of households. However, these networks tend to have a noise level that is difficult to tolerate in a digital environment, especially for time-sensitive data.

Noise in the cable system has many potential sources, including loose connectors, cracked cables, broken multi-tap spigots, lightning, power line arcing, arc welding and shortwave and HAM broadcasts.

Measurements have shown that many existing noise sources produce effects that last 10–15 ms. In a typical environment using 10 MBit/second Ethernet as the digital delivery system, this can affect 10 or more successive packets. Therefore, any system which attempts to deal with error recovery in this scenario must allow for multiple successive packets to be lost.

Parity re-generation of lost data is a common technique in the data storage industry. Using modulo-2 arithmetic, a lost data block can be reconstructed using other data blocks in the same data group, together with a parity block that represents the modulo-2 addition of all the data blocks in the group.

To be useful in a wide area network experiencing multiple successive packet loss, the common technique of encoding a parity block for N successive data blocks will fail. Multiple packets in a group will be lost, making reconstruction impossible.

SUMMARY OF THE INVENTION

According to the present invention there is provided a method and apparatus for delivering digital data packets containing video information read from a storage device into a computer network which allows network transmission errors in successive data packets to be corrected during reception without re-transmitting the damaged packets over the network.

The steps of the invention include reading the stream of data packets containing the video information from a storage device; segregating the stream of data packets into a pre-determined number N of pre-reorganized groups, each pre-reorganized group containing a pre-determined number M of data packets; adding a parity packet to each pre-reorganized group, each parity packet containing information sufficient to enable recreation of a damaged data packet within the group; reorganizing the packets in the pre-determined number N of pre-reorganized groups into M+1 post-reorganized groups, each post-reorganized group containing N packets, no two of which are contained in any single pre-reorganized group; and delivering the post-reorganized groups into the computer network.

A system or an apparatus for delivering a stream of digital data packets containing video information into a computer network which allows network transmission errors in successive data packets to be corrected during reception without re-transmitting the damaged packets over the network is possible by integrating a storage device for storing the stream of digital data packets containing video information; a controller connected to the storage device for causing said storage device to output a stream of data packets containing the video information from; and a re-sequencer for interleaving, or reorganizing the output data stream.

The re-sequencer reorganizes the output data stream by segregating the stream of data packets into a pre-determined number N of pre-reorganized groups, each pre-reorganized group containing a pre-determined number M of data packets; adding a parity packet to each pre-reorganized group, each parity packet containing information sufficient to enable recreation of a damaged data packet within the group; reorganizing the packets in the pre-determined number N of pre-reorganized groups into M+1 post-reorganized groups, each post-reorganized group containing N packets, no two of which are contained in any single pre-reorganized group; and delivering the post-reorganized groups into the computer network.

By utilizing these methods and systems, data communication becomes less likely to require re-transmission of data due to consecutive data packet losses.

These and other aspects, features, and advantages of the present invention will be apparent to those persons having ordinary skilled in the art to which the present invention relates from the foregoing description and the accompanying drawings.

DETAILED DESCRIPTION OF THE PREFERRED EMBODIMENT(S)

Figure 1:
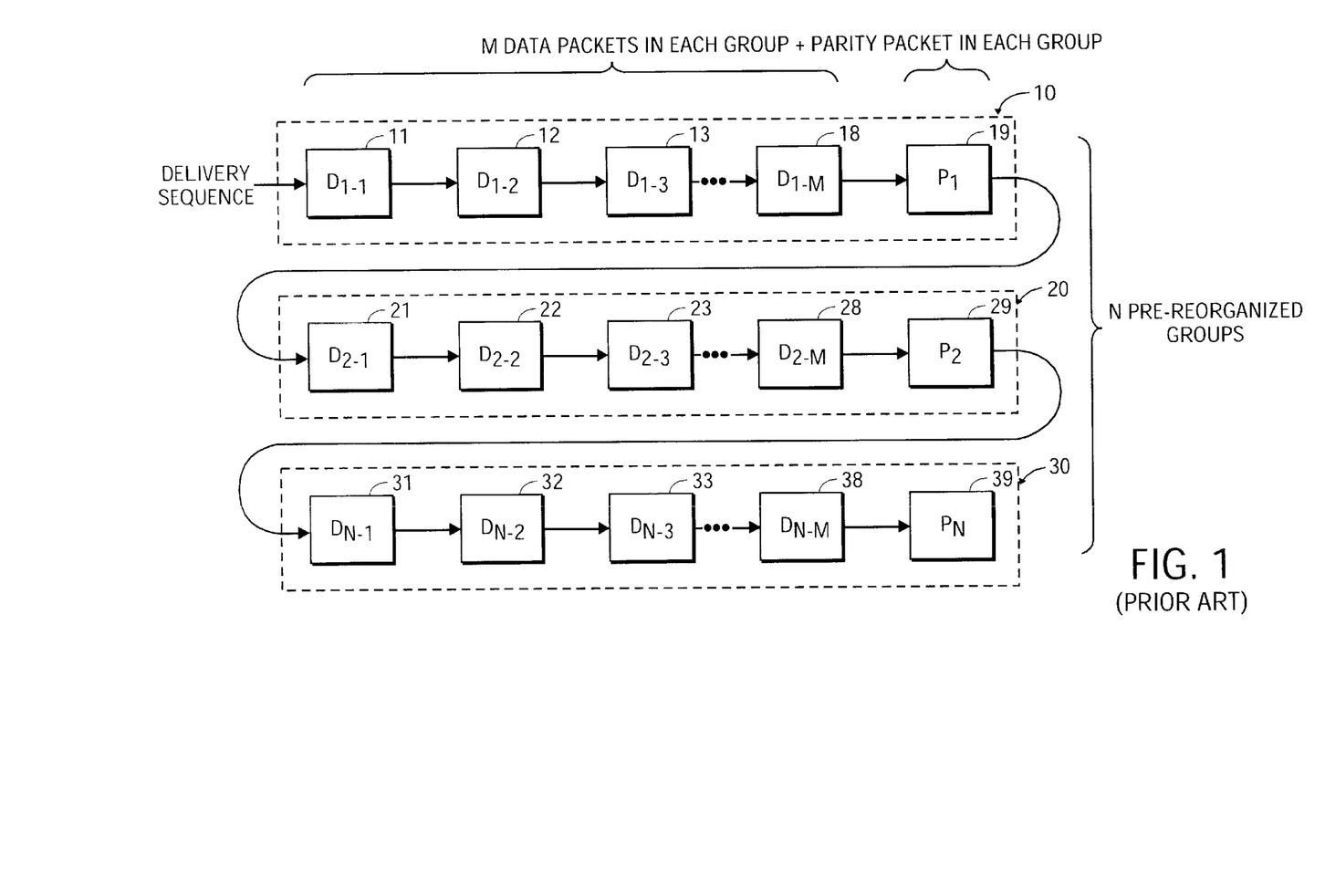
FIG. 1 illustrates a stream of data packets and parity packets in the order in which the packets are sent using prior art methods.

Referring to the drawings, particularly to FIG. 1, computer data which may represent audio, compressed video, or other data requiring real-time delivery is illustrated as a set of data packets organized as N groups of M data packets in each group. Each group is designated by its group number n where n ranges from 1 to N, inclusive. Each group n comprises M data packets designated Dn-m where n is the group number and m is the packet number within the group and where m ranges from 1 to M, inclusive. In addition, each group n has an M+$1^{th}$ element which is a parity packet containing error correcting, parity data for data packets of the group. The parity packet will be refer to as $P_n$ where n is the group number in which the packet Pn belongs.

In FIG. 1, the entire data is divided into N groups ranging from the first group 10 to the $N^{th}$ group 30. The first group 10 comprises M data packets 11, 12, 13, . . . 18 and a parity packet 19 for a total of M+1 elements.

Parity is a quality of a bit of data being either odd or even. Parity checking is one of the common forms of error detection and correction in communication. At a byte level, party checking is used as the eighth bit with seven bits of data. At a packet level, the parity packet is formed using the modulo-2 operation on the data packets of the group of packets to which the parity packet belongs. Parity re-generation of lost data is a common technique in the data storage industry. Using modulo-2 arithmetic, a lost data block can be reconstructed using other data blocks in the same data group, together with the parity block that represents the modulo-2 addition of all the data blocks in the group.

Continuing to refer to FIG. 1, the data is grouped into N groups. Each group has M data packets plus a M+$1^{th}$ element which is a parity packet for the group. For instance, the group 10 has M data packets named $D_{1-1}$ 11, $D_{1-2}$ 12, $D_{1-3}$ 13, . . . $D_{1-M}$ 18 and parity packet $P_1$ 19 for a total of M+1 packets. Likewise, the group 2 comprises data packets $D_{2-1}$ 21, $D_{2-2}$ 22, $D_{2-3}$ 23, . . . $D_{2-M}$ 28 and parity packet $P_2$ 29 for a total of M+1 packets. In the figure, the last group comprises data packets $D_{N-1}$ 31, $D_{N-2}$ 32, $D_{N-3}$ 33, and $D_{N-M}$ 38 and parity packet $P_N$ 39.

In the prior art, the packets are sent sequentially as indicated by the line-arrows of FIG. 1. In particular, the order of the delivery of the packets is:

$D_{1-1}$ 11→$D_{1-2}$ 12→$D_{1-3}$ 13→ . . . →$D_{1-m}$ 18→$P_1$ 19→$D_{2-1}$ 21→$D_{2-2}$ 22→$D_{2-3}$ 23→ . . . →$D_{2-M}$ 28→$P_2$ 29→ . . . →$D_{N-1}$ 31→$D_{N-2}$ 32→$D_{N-3}$ 33→ . . . →$D_{N-M}$ 38→$P_N$ 39.

As discussed above, if a single data packet is corrupted due to a transmission error, then the rest of the data packets of the group may be used, along with the parity packet for the group, to recreate the corrupted data packet at the receiving end. For example, if the packet $D_{1-2}$ 12 is corrupted due to line noise, packets $D_{1-1}$ 11, $D_{3-1}$ 13 . . . $D_{1-n}$ 18, and $P_1$ 19 can be used to recreate the corrupted packet $D_{1-2}$ 12. However, if two or more data packets within a group are corrupted, the receiver must request the entire data or at least the data group to be re-transmitted. For instance if $D_{1-2}$ 12 and $D_{1-3}$ 13 are corrupted during delivery, the receiver of the data, or the client C, cannot recreate the corrupted packets using the remaining packets of the group, forcing the sender, or the host H, to re-transmit the entire data or at least the data packets of the first group 10 and the parity packet $P_1$ 19. Re-transmission of data introduces delay into the system which is often not acceptable for compressed video or other real-time data.

As discussed above, noise in existing cable systems often produces effects that last b 10–15ms, adversely affecting 10 or more successive data packets. If the sequential data packet transmission technique of the prior art is used, it would require re-transmission of many groups of data packets, often causing unacceptable delay of video or other real-time data.

Figure 2:
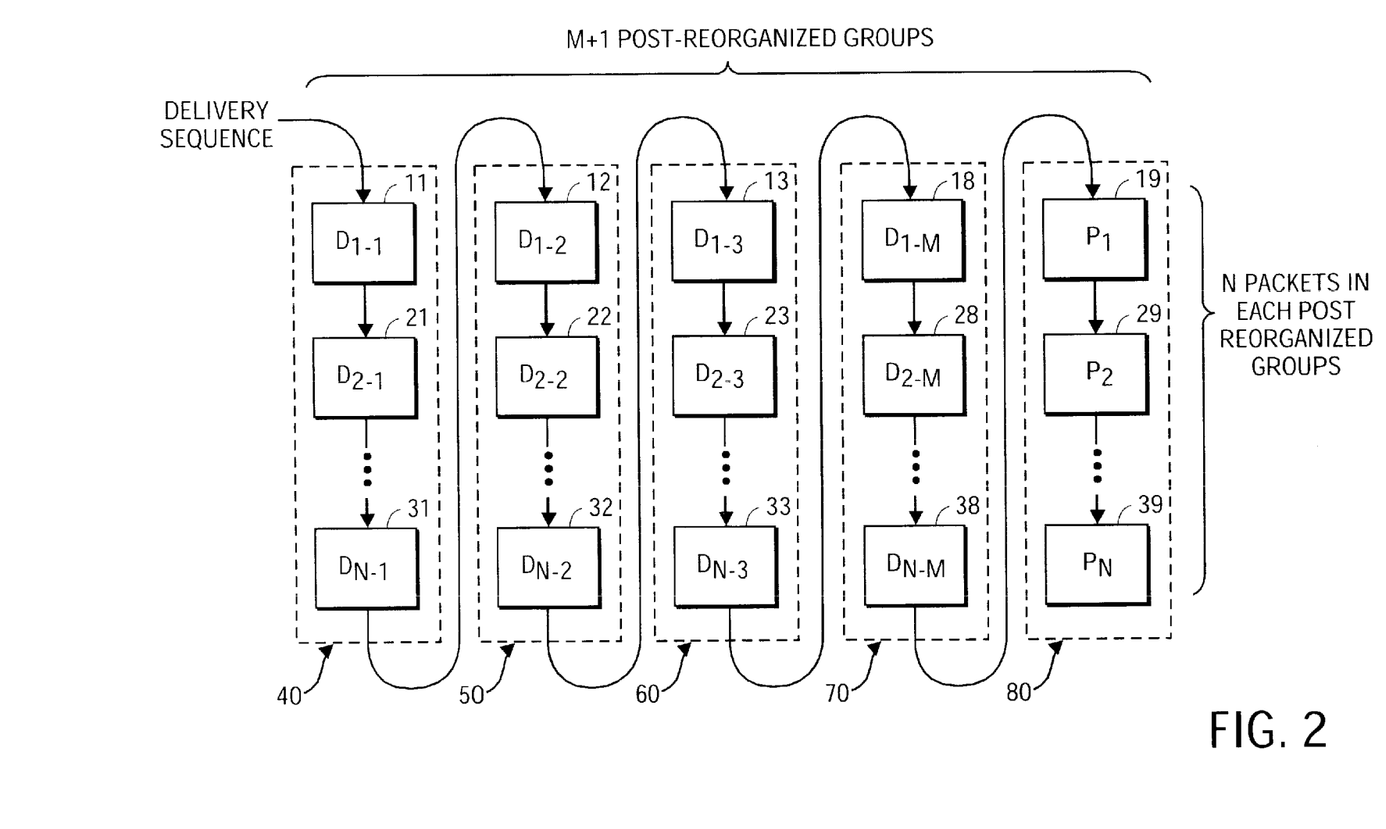
FIG. 2 illustrates a stream of data packets and parity packets in the order in which the packets are sent using a preferred method of the present invention.

Referring to FIG. 2, a new method of organizing data is illustrated. Similar to the prior art as disclosed by FIG. 1, the data is initially grouped into N groups with each group comprising M data packets and one parity packet for a total of M+1 packets. However, unlike the prior art, the data packets are not delivered sequentially. For the preferred embodiment of the present invention, the data packets are interleaved, or reorganized, prior to being delivered such that no two data packets of a same pre-reorganized group is contained in the same post-reorganized group.

For clarity of discussion, the groups and the packets identified by FIG. 1 will be referred to as the pre-reorganized groups and packets, and the groups and the packets identified by FIG. 2 will be referred to as the post-reorganized groups and packets. N represents the number of groups in the pre-reorganized group, each of which has M+1 packets. M+1 represents the number of groups in the post-reorganized group, each of which has N packets. The "reorganization" refers to the technique of reorganizing the packets for delivery.

Continuing to refer to FIG. 2, the figure illustrates how the data is reorganized, or interleaved from N pre-reorganized groups of M+1 packets each (M data packets and one parity packet) to M+1 post-reorganized groups of N packets each. For clarity of this discussion, the data packet designations have been kept consistent between FIG. 1 and FIG. 2. Each of the post-reorganized groups 40, 50, 60, 70, and 80, comprises only one packet from each of the pre-reorganized groups 10, 20, and 30 of FIG. 1.

As indicated by the arrows of FIG. 2, after the reorganization, the newly interleaved data is sent in the following order:

$D_{1-1}$ 11→$D_{2-1}$ 21→ . . . →$D_{N-1}$ 31→$D_{1-2}$ 12→$D_{2-2}$ 22→ . . . →$D_{N-2}$ 32→$D_{1-3}$ 13→$D_{2-3}$ 23→ . . . →$D_{N-3}$ 33→ . . . →$D_{1-M}$ 18→$D_{2-M}$ 28→ . . . →$D_{N-M}$ 38→$P_1$ 19→$P_2$ 29→$P_3$ 39.

One primary advantage of the reorganization of data and the new sequence of data transfer over the prior art method is that even when sequential data packets are corrupted, the data packets can often be recreated by the receiver without requesting a retransmission of data.

For example, if two sequential data packets $D_{1-2}$ 12 and $D_{2-2}$ 22 are corrupted during the transmission of the data, the corrupted packets can be recreated. The corrupted data packet $D_{1-2}$ 12 can be recreated by using $D_{1-1}$ 11, $D_{1-3}$ 13, . . . $D_{1-M}$ 18, and $P_2$ 19. The corrupted data packet $D_{2-2}$ 22 can be recreated by using $D_{2-1}$ 21, $D_{2-3}$ 23, $D_{2-M}$ 28, and $P_2$ 29.

In fact, for any data segmented into N pre-reorganized groups, a maximum of N consecutive post-reorganized packets can be corrupted without having to re-transmit any data. For example, if N=3 and M=4, then the data packets or boxes of FIG. 2 reflects the entire data to be delivered. As we can see from the figure, up to 3 (=N) consecutive packets may be corrupted without corrupting more than one packet from any of N pre-reorganized groups.

For instance, consecutive packets $D_{N-1}$ 19, $D_{2-1}$ 21, and $D_{2-2}$ 22 can be corrupted without corrupting more than one packet from any of the N pre-reorganized groups of FIG. 1.

Applying this advantage to the cable networking connections, where it may lose up to ten consecutive data packets, if the data is organized into at least ten pre-reorganized groups, i.e. N>=10, which will be interleaved for transmission, it can minimize or even reduce the re-transmission requirement due to data loss.

Another advantage of the present invention is that after the reorganization, the minimum number of consecutive data packets which can be corrupted without requiring re-transmission of data is increased to N+1.

This concept can be best illustrated by first studying the prior art as illustrated by FIG. 1. The prior art delivery method required re-transmission of data if three or more consecutive packets are corrupted. For instance, any combination of the corruption of the following sets of three data packets, delivered as depicted by FIG. 1, requires re-transmission of at least one group of data:

| Consecutive packets corrupted: | Result of the loss: |
|---|---|
| $D_{1-1}$ 11, $D_{1-2}$ 12, and $D_{1-3}$ 13 | requires re-transmission of group 1 |
| $D_{1-M}$ 18, $P_1$ 19, and $D_{2-1}$ 21 | requires re-transmission of group 1 |
| $P_1$ 18, $D_{2-1}$ 21, and $D_{2-2}$ 22 | requires re-transmission of group 2 |

Furthermore, in most of cases, loss of even two consecutive packets requires re-transmission of data. Consider the following table:

| Consecutive packets corrupted: | Result of the loss: |
|---|---|
| $D_{1-1}$ 11 and $D_{1-2}$ 12 | requires re-transmission of group 1 |
| $D_{1-2}$ 12 and $D_{1-3}$ 13 (any consecutive two packets within a group) | requires re-transmission of group 1 requires re-transmission of the group |
| $D_{1-M}$ 18 and $P_1$ 19 | requires re-transmission of group 1 |
| $P_1$ 19 and $D_{2-1}$ 21 | does not require re-transmission. $P_1$ 19 does not contain data, $D_{2-1}$ 21 can be recreated by using $D_{2-2}$ 22, . . . $D_{2-M}$ 28 and $P_2$ 19. |

In sum, the prior art method required data re-transmission for most of the cases when two or more consecutive packets were corrupted and for all the cases when three or more consecutive packets were corrupted.

In contrast, the reorganized delivery sequence of the present invention requires a minimum of N+1 consecutive packets to be corrupted before requiring any groups of data to be re-transmitted. This is apparent from FIG. 2 where any loss of N consecutive packets or less results in the loss of only one packet from any pre-reorganized group.

Referring to the cable communication network where noise may adversely affect 10 or more successive packets, if N=10, then even the loss of ten consecutive packets would not require re-transmission of any data.

Figure 3:
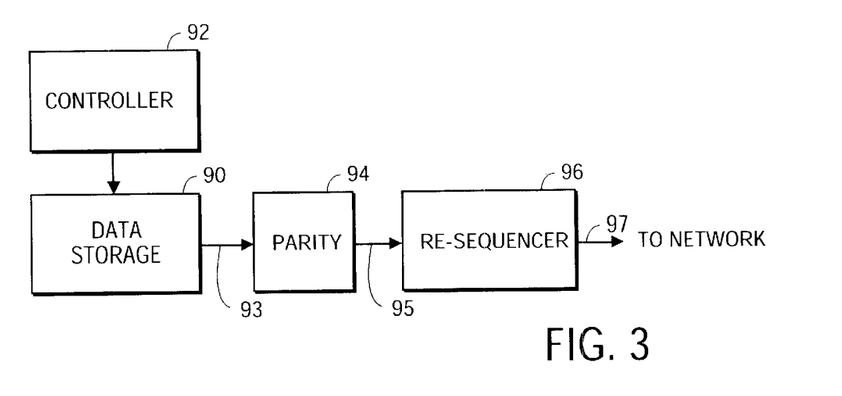
FIG. 3 illustrates a preferred embodiment of a system implementing the packet resequencing method of the present invention to send data over a network.

Referring now to FIG. 3, an illustrative system implementing the packet resequencing method of the present invention to send data over a network is illustrated. A controller 92, connected to a digital data storage 90 cause the storage device to output a stream of data 93 to a parity generator 94. The data storage 90 may store the data in packet format or may generate packets of predetermined groups in predetermined numbers per group. The parity generator 94 uses the modulo-2 method to generate a parity packet for each of the groups of data being sent to it by the data storage 90. The data 95 leaving the parity generator 94 and reaching the re-sequencer 96 is in the order illustrated by FIG. 1. The re-sequencer 96 reorganizes the data by interleaving the data packets and parity packets to result in the organization illustrated by FIG. 2. Finally, the reorganized data 97 is sent to the network.

Figure 4:
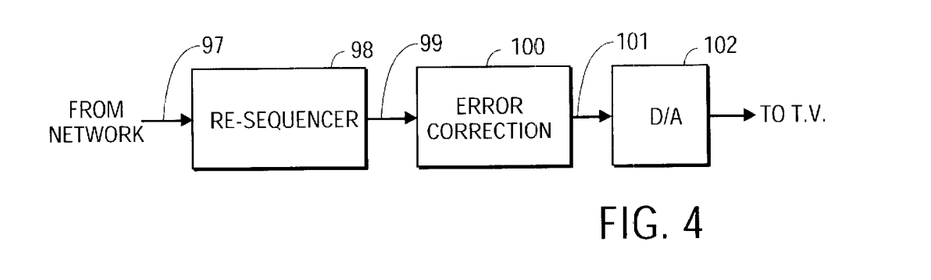
FIG. 4 illustrates a preferred embodiment of a system implementing the packet resequencing method of the present invention to receive data from a network.

Referring now to FIG. 4, an illustrative system implementing the packet resequencing method of the present invention to receive data from a network is illustrated. A re-sequencer 98 receives the interleaved data 97 from the network and reverses the reorganization performed by the re-sequencer 96 of FIG. 3. The data 99 sent from the re-sequencer 98 to the error corrector 100 is in the order illustrated by FIG. 1. The error corrector 100 reconstructs missing data packets if possible. Then, the corrected data stream 101 is sent to the digital to analog converter 102 to be converted into analog signals for a television set.

Figure 5:
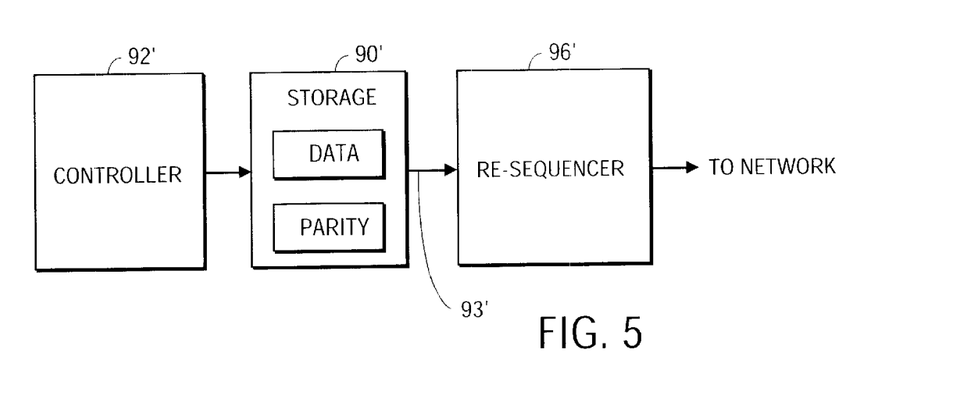
FIG. 5 illustrates another embodiment of a system implementing the packet resequencing method of the present invention to send data.

FIG. 5 illustrates another embodiment of a system implementing the packet resequencing method of the present invention to send data. Similar to the system illustrated by FIG. 3, the controller 92' causes a storage unit 90' to output a stream of data 93'; however, in the embodiment illustrated by FIG. 5, the parity information has been pre-generated, and is already stored by the data storage unit 90'. Therefore, the output stream of data 93' is sent directly to a re-sequencer 96' which performs the interleaving or the reorganizing of the data in accordance to the method discussed above in reference to FIG. 2.

Figure 6:
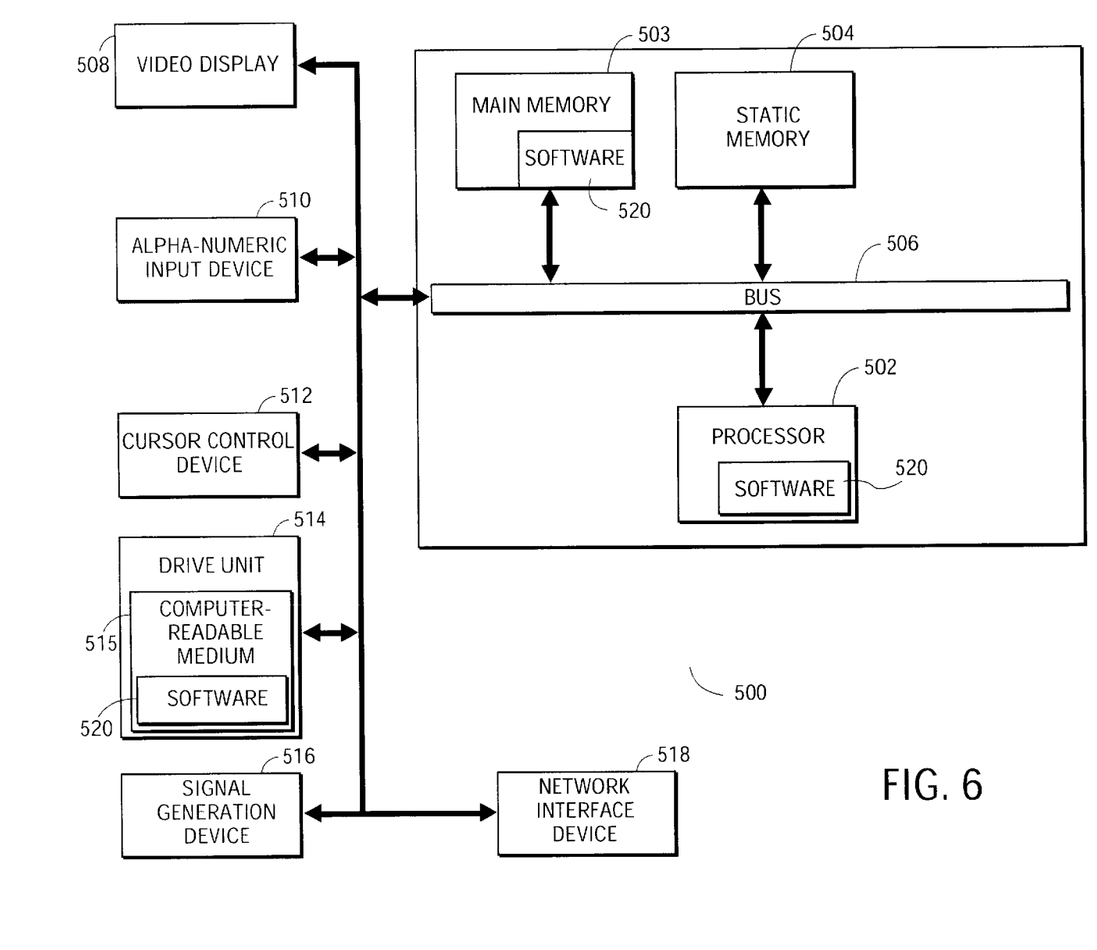
FIG. 6 is a diagram of a computer system for implementing another embodiment of the present invention using software.

FIG. 6 is a diagram of a computer system 500 within which software for performing the methodologies discussed above may operate. The computer system 500 includes a processor 502, a main memory 503, and a static memory 504 which communicate via a bus 506. The system 500 is further shown to include a video display 508 (e.g., a liquid crystal display (LCD) or a cathode ray tube (CRT)). The computer system 500 also includes an alpha-numeric input device 510 (e.g., a keyboard), a cursor control device 512 (e.g., a mouse), a disk drive unit 514, a signal generation device 516 (e.g., a speaker) and a network interface device 518. The disk drive unit 514 includes a computer-readable medium 515 on which software 520 resides, completely or at least partially, within the main memory 503 and/or within the processor 502. The software 520 may further be transmitted or received via the network interface device 518. The term "computer-readable medium" shall be taken to include any medium which is capable of storing or encoding a sequence of instructions for execution by a processor and that cause the processor to perform the methodologies of the present invention. The term "computer-readable medium" shall be taken to include, but not be limited to, solid-state memories, optical and magnetic disks, and carrier wave signals.

Figure 7:
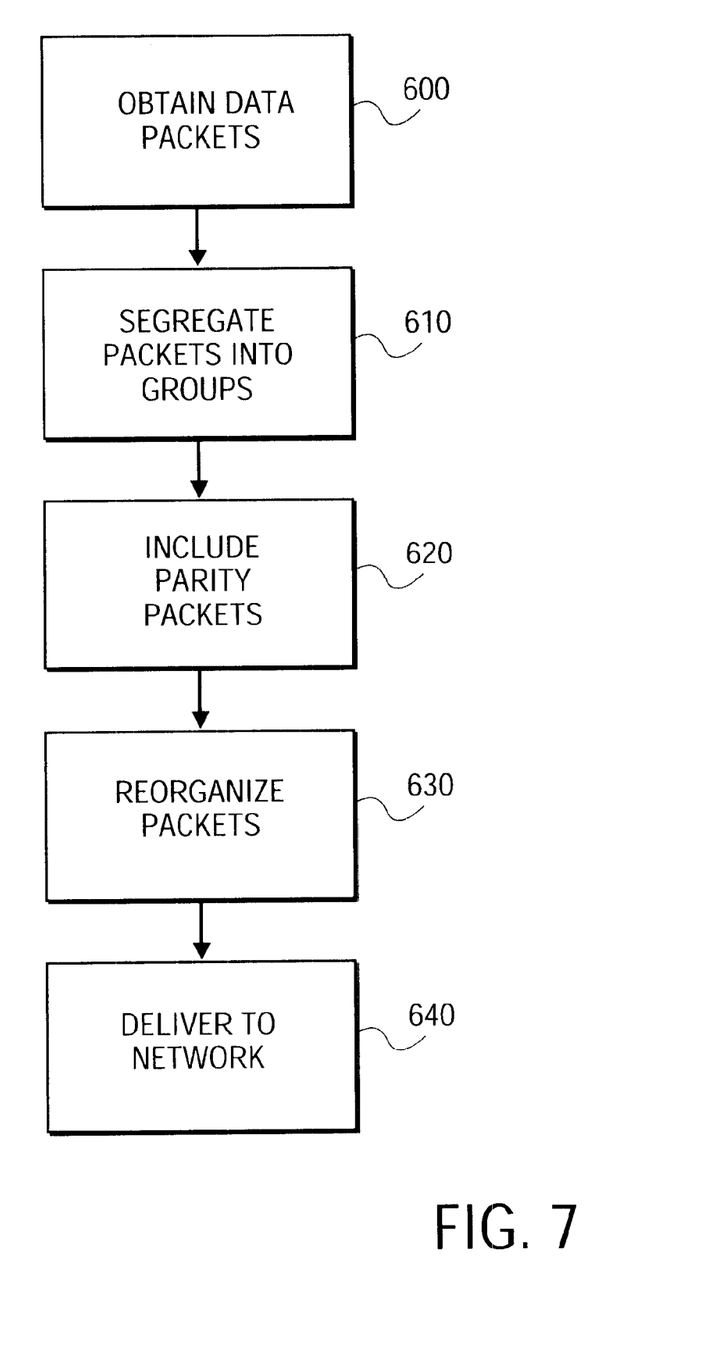
FIG. 7 is a flow diagram of a process for reorganizing packets in accordance with one embodiment of the present invention.

FIG. 7 is a flow diagram of a process for reorganizing packets in accordance with one embodiment of the present invention. As shown in FIG. 7, the first step 600 is to obtain the data packets. These can be obtained from a variety of sources, such as a storage device, RAM, hard drive, floppy diskette, CD-ROM, optical disk, magnetic tape, magnetic disk, or a real-time device, such as a camera.

The next step 610 is to segregate the packets into a pre-determined number m of pre-reorganized group, each pre-reorganized group containing a pre-determined number M of data packets.

The next step 620 is to include a parity packet with each pre-reorganized group, each parity packet containing information sufficient to enable re-creation of a damaged data packet within the group. The parity packets can come from the storage device or can be created in real time.

The next step 630 is to reorganize the packets in the pre-determined number N or pre-reorganized groups into M+1 post-reorganized groups, each post-reorganized group containing N packets, no two of which are contained in any single pre-reorganized group.

The last step 640 is to deliver the post-reorganized groups into the computer network.

Figure 8:
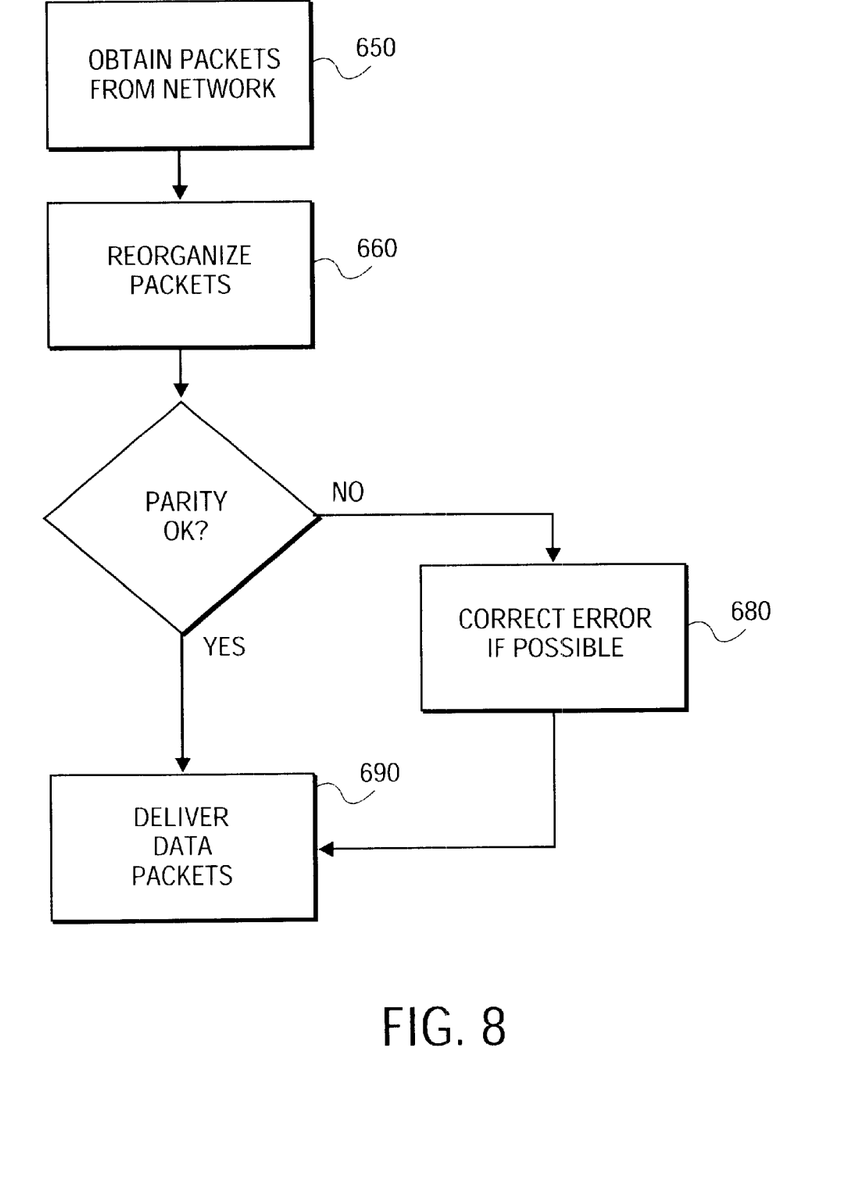
FIG. 8 is a flow diagram of a process for reorganizing packets in accordance with another embodiment of the present invention.

FIG. 8 illustrates a complimentary process used to reorganize the packets back into their original form for use in accordance with one embodiment of the invention. As shown in FIG. 8, the first step 650 is to obtain the packets from a delivery system, such as a network. The next step 660 is to reorganize the packets back into their original sequence. A parity check step 670 then examines the received packets to insure that they are error free. If an error is detected, that error is corrected if possible in step 680. The error-free data is then delivered in step 690 for use.

Although the present invention has been described in detail with exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. For example, the source of the data packets need not be a storage device. The invention also contemplates real time devices, such as a camera. The data packets themselves also need not represent video information. The invention also contemplates data packets representing other types of information. As also previously discussed, the parity data can be stored or generated in real time.

The invention is also not limited to the exact resequencing which has been discussed. The invention also embraces other sequencing methodologies in which an original sequence is resequenced prior to delivery into the network and then restored following receipt from the network. Although having been discussed in terms of a network, moreover, the invention is also not limited to having the resequenced data packets being delivered over a network.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A method for delivering a stream of digital data packets from a data source to a data destination, the method comprising:

obtaining the stream of data packets from the data source;

segregating the stream of data packets into a pre-determined number N of pre-reorganized groups, each pre-reorganized group containing a predetermined number M of data packets;

including a parity packet with each pre-reorganized group, each parity packet containing information sufficient to enable recreation of a damaged data packet within the group;

reorganizing the packets in the pre-determined number N of pre-reorganized groups into M+1 post-reorganized groups, each post-reorganized group containing N packets, no two of which are contained in any single pre-reorganized group; and delivering the post-reorganized groups to the data destination.

2. The method of claim 1 wherein each packet in each pre-reorganized group occupies a particular position with respect to all other packets within the same group and wherein all of the packets in each post-reorganized group occupied the same particular position in the pre-reorganized groups from which they came.

3. The method of claim 2 wherein each parity packet within each pre-reorganized group occupies the last position within said group.

4. The method of claim 2 wherein the post-reorganized groups are delivered into the network in the same sequence as their respective packets were sequenced in the pre-reorganized groups from which they came.

5. The method of claim 1 wherein each parity packet is the module-2 sum of the data packets within its pre-reorganized group.

6. The method of claim 1 wherein each parity packet is not stored on the storage device.

7. The method of claim 1 wherein each parity packet is stored on the storage device.

8. The method of claim 1 wherein the stream of packets represents video information.

9. The method of claim 1 wherein the data source is a storage device.

10. The method of claim 1 wherein the data source is a camera.

11. An apparatus for delivering a stream of digital data packets into a computer network which allows network transmission errors in successive data packets to be corrected during reception without re-transmitting the damaged packets over the network comprising:

a. a device for generating the stream of digital data packets;

b. a controller connected to said device for causing said device to output a stream of data packets, and c. a re-sequencer connected to said device for
   i. segregating the stream of data packets into a pre-determined number N of pre-reorganized groups, each pre-reorganized group containing a pre-determined number M of data packets;
   ii. including a parity packet with each pre-reorganized group, each parity packet containing information sufficient to enable recreation of a damaged data packet within the group;
   iii. reorganizing the packets in the pre-determined number N of pre-reorganized groups into M+1 post-reorganized groups, each post-reorganized group containing N packets, no two of which are contained in any single pre-reorganized group; and
   iv. delivering the post-reorganized groups into the computer network.

12. The apparatus according to claim 11 wherein said storage device is selected from a group consisting of RAM, hard drive, floppy diskette, CD-ROM, magneto-optical disk, magnetic tape, and magnetic disk.

13. The apparatus of claim 11 wherein said re-sequencer causes each packet in each pre-reorganized group to occupy a particular position with respect to all other packets within the same group and causes all of the packets in each post-reorganized group to occupy the same particular position in the pre-reorganized groups from which they came.

14. The apparatus of claim 11 wherein said re-sequencer causes each parity packet within each pre-reorganized group to occupy the last position within said group.

15. The apparatus of claim 11 wherein said re-sequencer causes the post-reorganized groups to be delivered into the network in the same sequence as their respective packets were sequenced in the pre-reorganized groups from which they came.

16. The apparatus of claim 11 wherein said re-sequencer causes each parity packet to be the module-2 sum of the data packets within its pre-reorganized group.

17. The apparatus of claims 11 wherein each parity packet is not stored on a storage device.

18. The apparatus of claim 11 wherein each parity packet is stored on a storage device.

19. The apparatus of claim 11 wherein the stream of packets represents video information.

20. The apparatus of claim 11 wherein the data source is a storage device.

21. The apparatus of claim 11 wherein the data source is a camera.

22. A method for delivering a stream of digital data packets from a data source to a data destination, the method comprising the steps of:
 a. obtaining the stream of data packets from the data source;
 b. segregating the stream of data packets into a pre-determined number N of pre-reorganized groups, each pre-reorganized group containing a pre-determined number M of data packets;
 c. including a parity packet with each pre-reorganized group, each parity packet containing information sufficient to enable recreation of damaged data packet within the group; and
 d. reorganizing the packets in the pre-determined number N of pre-reorganized groups into M+1 post-reorganized groups, each post-reorganized group containing N packets, no two of which are contained in any single pre-reorganized group.

23. A method of transmitting a sequence of digital data units, having an in-order sequence, from a data source to a data destination, the method including the steps of:
 dividing the sequence of digital data into a plurality of groups of data units, each group of data units maintaining the in-order sequence;
 including a respective error correction indication for each group within the in-order sequence of digital data units;
 reorganizing the in-order sequence including the error correction indication into digital data units in an out-of-order sequence; and
 transmitting the digital data units in the out-of order sequence from the data source.

24. The method of claim 23 wherein the step of transmitting comprises the step of transmitting data units, spaced from each other by Z intermediate data units in the in-order sequence, as consecutive transmitted data units in the out-of-order sequence.

25. The method of claim 23 wherein the step of transmitting comprises transmitting data units from corresponding locations within each of the plurality of groups as consecutive transmitted data units in the out-of-order sequence.

26. The method of claim 23 wherein the step of dividing comprises dividing the sequence of digital data units into N groups, each group including M data units, and the step of including a respective correction indication comprises including the respective error correction indication as a M+1th data unit within each group.

27. The method of claim 26 wherein the step of transmitting comprises the step of transmitting data units spaced from each other by M+1 intermediate data units in the in-order sequence, as consecutive transmitted data units in out-of-order sequence.

28. The method of claim 23 including the steps of:
 receiving the out-of-order sequence of data units at the data destination; and
 restoring the in-order sequence to the received data units.

29. The method of claim 28 including the step of utilizing a respective error correction indication to check for an error in an associated group of data units.

30. A method of detecting an error in a sequence of digital data units, having an in-order sequence, the method including the steps of:
 receiving the digital data units in an out-of-order sequence, each data unit including an error correction indication;
 restoring the in-order sequence to the received data units;
 grouping the in-order sequence of data units into N groups; and
 performing an error check operation utilizing the respective error correction indication associated with each of the N groups of data units.

31. The method of claim 30 wherein the step of restoring comprises the step of identifying data units, spaced from each other by Z intermediate data units in the out-of-order sequence, as consecutive data units within the in-order sequence.

32. Apparatus for transmitting a sequence of digital data units, having an in-order sequence, from a data source to a data destination, the apparatus comprising:
 a parity generator to divide the sequence of digital data into a plurality of groups of data units, each group of data units maintaining the in-order sequence, and to include a respective error correction indication for each group within the in-order sequence of digital data units; and
 a re-sequencer to transmit the digital data units from the data source so that the digital data units including the error correction indication are arranged in an out-of-order sequence.

33. The apparatus of claim 32 wherein the re-sequencer is to transmit data units, spaced from each other by Z intermediate data units in the in-order sequence, as consecutive transmitted data units in the out-of-order sequence.

34. The apparatus of claim 32 wherein the re-sequencer is to transmit data units of corresponding locations within each of the plurality of groups as consecutive transmitted data units in the out-of-order sequence.

35. The apparatus of claim 32 wherein the parity generator is to divide the sequence from digital data units into N groups, each group including M data units, and to include the respective error correction indication as a M+1th data unit within each group.

36. The apparatus of claim 35 wherein the re-sequencer is to transmit data units, spaced from each other by M+1 intermediate data units in the in-order sequence, as consecutive transmitted data units in out-of-order sequence.

37. Apparatus for detecting an error in a sequence of digital data units, having an in-order sequence, the apparatus comprising:
 a re-sequencer to receive the digital data units, each including an error correction indication, in an out-of-order sequence, and to restore the in-order sequence to the received data units; and
 an error corrector to group the in-order sequence of data units into N groups, and to perform an error check operation utilizing the respective error correction indication associated with each of the N groups of data units.

38. The apparatus of claim 37 wherein the re-sequencer is to identify data units, spaced from each other by Z intermediate data units in the out-of-order sequence, as consecutive data units within the in-order sequence.

39. A machine-readable medium storing a sequence of instructions that, when executed by a machine, cause the machine to perform the steps of:

dividing a sequence of digital data, having an in-order sequence, into a plurality of groups of data units, each group of data units maintaining the in-order sequence;

including a respective error correction indication of each group within the in-order sequence of digital data units;

reorganizing the in-order sequence including the error correction indication into digital data units in an out-of-order sequence; and transmitting the digital data units in the out-of-order sequence from a data source to a data destination.

40. A machine-readable medium storing a sequence of instructions stored therein that, when executed by a machine, cause the machine to perform the steps of:

receiving the digital data units, having an in-order sequence in which each digital data unit includes an error correction indicator, in an out-of-order sequence;

restoring the in-order sequence to the received data units;

grouping the in-order sequence of data units into N groups; and performing an error check operation utilizing the respective error correction indication associated with each of the N groups of data units.

* * * * *